United States Patent
Jensen et al.

(10) Patent No.: US 11,426,651 B1
(45) Date of Patent: Aug. 30, 2022

(54) LAP JOYSTICK CONTROLLER

(71) Applicants: Darryl Ingvard Jensen, Scottsdale, AZ (US); Jace Ingvard Jensen, Scottsdale, AZ (US)

(72) Inventors: Darryl Ingvard Jensen, Scottsdale, AZ (US); Jace Ingvard Jensen, Scottsdale, AZ (US)

( * ) Notice: Subject to any disclaimer, the term of this patent is extended or adjusted under 35 U.S.C. 154(b) by 0 days.

(21) Appl. No.: 17/323,888

(22) Filed: May 18, 2021

(51) Int. Cl.
*A63F 13/245* (2014.01)

(52) U.S. Cl.
CPC .................. *A63F 13/245* (2014.09)

(58) Field of Classification Search
CPC ..................................... A63F 13/245
See application file for complete search history.

(56) References Cited

U.S. PATENT DOCUMENTS

| | | | | |
|---|---|---|---|---|
| 3,698,328 A * | 10/1972 | Weir | ................... | A47B 23/025 108/6 |
| 4,494,754 A * | 1/1985 | Wagner, Jr. | ............. | A63F 13/02 248/176.1 |
| 5,551,701 A * | 9/1996 | Bouton | .................. | G05G 9/047 345/161 |
| 5,591,082 A * | 1/1997 | Jensen | .................... | A63F 13/06 434/45 |
| 5,610,631 A * | 3/1997 | Bouton | .................. | G06F 3/038 345/161 |
| 5,989,123 A * | 11/1999 | Tosaki | .................. | A63F 13/245 463/47 |
| 11,067,216 B2 * | 7/2021 | Johnson, Sr | ............ | F16B 7/149 |
| 2005/0099390 A1 * | 5/2005 | Ma | ........................ | A63F 13/245 345/158 |
| 2010/0255915 A1 * | 10/2010 | Spradley | .................. | G09B 9/08 463/38 |
| 2020/0387238 A1 * | 12/2020 | Parazynski | ............. | G08B 5/36 |

OTHER PUBLICATIONS

"Telescopic Joystick", IBM Technical Disclosure Bulletin, International Business Machines Corp. (Thornwood), US, vol. 31. No. 11, XP000052233, pp. 288-289 (Apr. 1, 1989). (Year: 1989).*

* cited by examiner

*Primary Examiner* — Thomas J Hong
*Assistant Examiner* — Carl V Larsen
(74) *Attorney, Agent, or Firm* — Mark S Hubert (57) ABSTRACT

A lap joystick controller for use in controlling the action of a computer game or a flight simulator. It is designed for placement on a chair between the user's legs, held firmly in place by a set of rubber bottom legs, a base flange that extends underneath the users legs and crouch, and the front, left and right side walls of the joystick controller's housing body. An internal weighted plate helps secure the device when it is used on a tabletop. It has a vertically adjustable joystick mounted in a horizontal lower panel that abuts a vertically angled upper panel that houses numerous switches, buttons and knobs. At the top end of the controller and the upper panel, is a rotary control housing that extends beyond the left and right sides of the controller's housing body. On the ends of this is interchangeably mounted, a throttle lever and a rotary knob. This controller closely approximates the much more expensive flight simulator chair.

5 Claims, 9 Drawing Sheets

LAP JOYSTICK CONTROLLER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to online and computer gaming accessories, and more particularly to electronic joystick technology.

BACKGROUND

Electronic joysticks (also called "yokes") are utilized with flight simulators and action games. They control various aspects of the game or simulation with both their joystick angle and actuator buttons. The prior art joystick units are available in several different designs. The most common for flight simulators is a dedicated bulky chair unit with a center stick controller, while handheld smaller units and table top units are commonly employed for "shooter" games and rapid movement games.

The problem with these prior art units is that the devices are either rigidly mounted or immovably constrained against the seat, or must be operated from behind a desk. Neither of these types of prior art devices take into consideration the size of the gamers, their personal comfort or their budget. Often, these units also must be hard wired to the game or computer.

Henceforth, a portable, user adjustable joystick adaptable to a plethora of games and flight simulators and that can be used in a multitude of positions and locations, would fulfill a long felt need in the gaming industry. This new invention utilizes and combines known and new technologies in a unique and novel configuration to overcome the aforementioned problems and accomplish this.

BRIEF SUMMARY

In accordance with various embodiments, a height adjustable gaming joystick is provided.

In one aspect, a gaming joystick that can be operated from atop a table, above the user's lap or beneath the user's legs is provided.

In another aspect, a gaming joystick with side wings to use the user's thighs to lock the joystick to the chair beneath them.

In yet another aspect, a gaming joystick that may be positioned for a center stick position, typical for a flight simulator.

In yet another aspect, a gaming joystick with an angle control panel facing the user for quick and easy access to the assignable control switches and buttons.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a gaming lap joystick controller ("joystick") to be used with computer games and flight simulators. Computer gaming systems generally use a hand-operated electronic controller to send commands (instructions) to direct the motions, actions and features of the game. These controller have different designs based on what their input is direction. The present controller, while adaptable to a plethora of games by virtue of its assignable buttons, levers, knobs, switches and joystick, is primarily intended as a tactile controller for use with a flight simulator. The tactile manipulation variables of the electronic joystick as well as the other mechanical input mechanisms are analog signals detected by the local control module and sent to the Central Processing Unit (CPU) of the game or flight simulator it is in electronic communication with. In the CPU this analog signal is compared to the data instructions of the game or flight simulator program and converted into a digital signal that makes the game respond with the action matched to the button, switch, knob, joystick, or lever pressed, pulled or tilted.

As used herein, the term "control module" refers to the electronic movement detection device that resides adjacent each control element, be it a switch, button, knob, lever or joystick. It is a printed circuit board (with or without a microprocessor/processor) with a motion sensing unit connected thereto and is in signal/data communication with the CPU of the game or flight simulator. It has power provided to it from its dedicated power supply or it can draw power form its wired connection to the CPU. The motion sensing unit may be as simple as a set of contacts made or broken by the action of the button or switch, or it may be an adjustable potentiometer linked to the rotation of a rotary lever or knob, or it may be a multi axis accelerometer or potentiometer changing resistance with the to the side to side, fore and aft motion of a joystick. The technology for these control modules is well known in the industry and is not encompassed in this invention.

Figure 7:
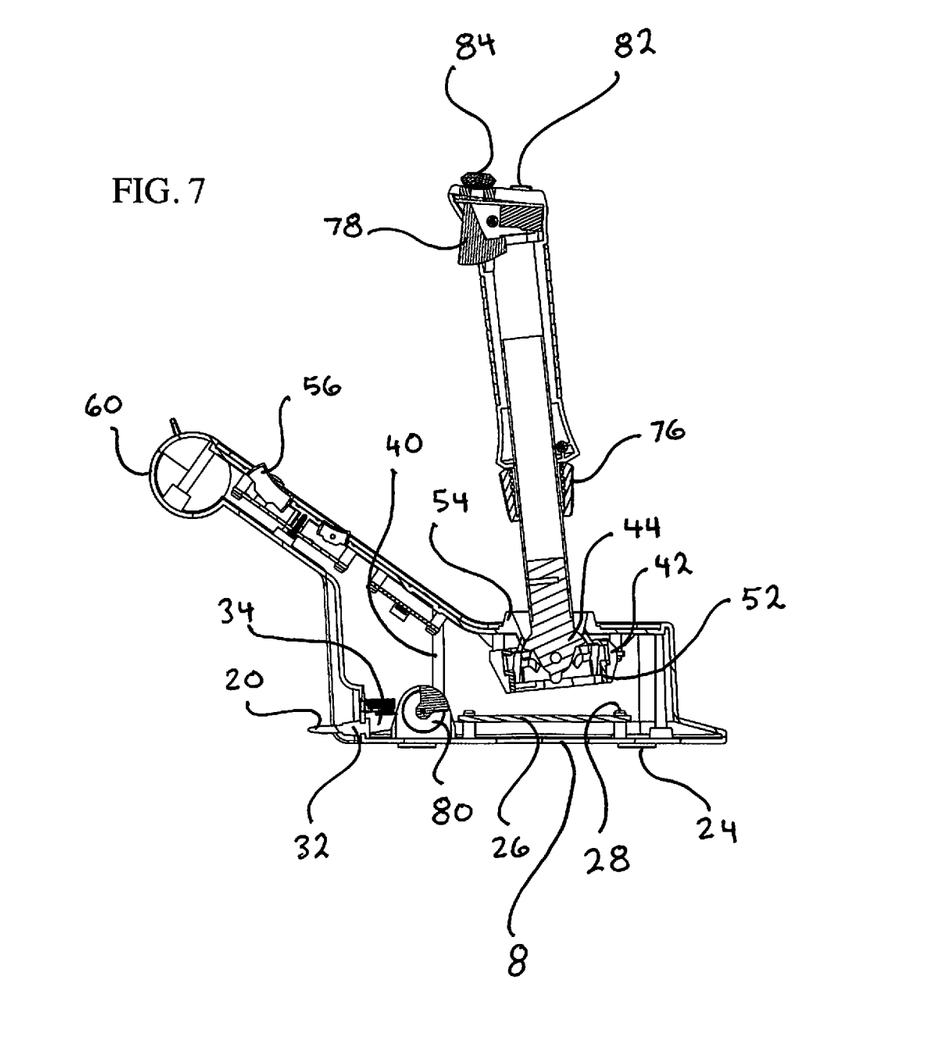
FIG. 7 is a left side cross sectional view of the joystick.

Looking at FIGS. 1-4 the design of the lap controller 2 can best be seen. The controller 2 has a vertically oriented, hollow housing body 4 that houses all of the various control input elements thereon as well as their various associated control modules therein. The body 4 has a back face, a rounded front face, two non-parallel sides extending between the back face and the front face that are closer to each other at the front face so as to form a flared U perimeter configuration. From the bottom of the housing body 4 extending horizontally from three of its sides (left, front and center) sides is a base flange 6. The base flange 6 has a planar bottom plate 8 (FIG. 7) that has grippy polymer feet 24 extending below it. a. This serves to prevent translation movement of the housing body 4 when the joystick 10 is manipulated. Optionally the feet 24 may be eliminated entirely and a grippy, matte polymer finish 16 may be applied directly thereon the outer face of this bottom plate 8. The flange 6 has an outer perimeter 12 that traces the configuration of the outer perimeter 14 of the housing body 4, set apart by a horizontal distance depicted by the dimensional arrow X. This distance X is substantial enough such that this flange 6 extends comfortably, far enough under the back of the legs and the crouch of the user so in conjunction with the feet 24 and/or the polymer matte finish 16 will secure the lap controller 2 from both translational and vertical movement, and place the joystick 10 between the user's legs. In the preferred embodiment the distance X for the width of this flange 6 is between two and six inches. The flange 6 tapers and narrows in thickness from the housing body perimeter 14 to its own perimeter 12 to comfortable transition under the user's lower body. At the same time, the left, right and front side vertical walls 34 of the housing body 4 will abut the user's inner thighs, further cradling the controller 2, centered in the user's body space.

Extending between the left, right and front side vertical walls 34 are the upper and lower top faces of the controller. These top faces are planar plates, removably affixed with mechanical fasteners 42 onto threaded stanchions 40 projecting vertically upward from the bottom plate 8. (FIG. 7) The lower top face 38 is generally horizontal and has an orifice formed therethrough to allow passage of the joystick 10. From its bottom, inner surface it supports an electronic gimbal housing 42. This gimbal housing 42 constrains the bulbous, proximal end 44 of the joystick 10 from vertical removal out of the housing body 4 yet allows the joystick 10 to tilt from side to side through 360 radial degrees, and also allows it to twist about its linear axis. The bulbous proximal end 44 has a shaft protruding from its lowest point lying along the linear axis of the joystick 10 that simultaneously sits in two perpendicular rotatable slotted gimbal shafts that allows movement in the X and Y axes. Potentiometers 50 connected to the PCB 52 in the gimbal housing 42 interpret the position of the rod as an analog signal and communicate these two axes directional signals to the control module which sends this information to the CPU of the game or simulator, as is well known in the art. Around the top of the orifice from which the joystick 10 passes and from which the joystick gimbal housing 42 is centered, there is a dust boot 54 to keep debris and liquids from entering into the gimbal housing 42.

Figure 1:
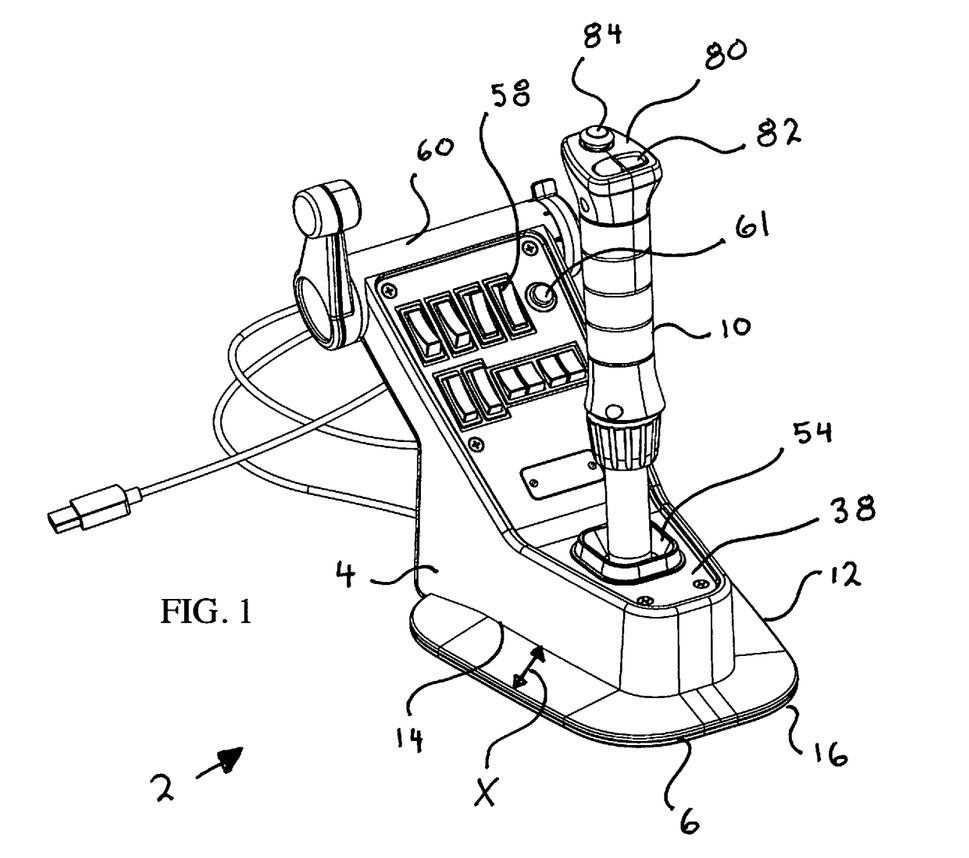
FIG. 1 is a front perspective view of the joystick.
Figure 2:
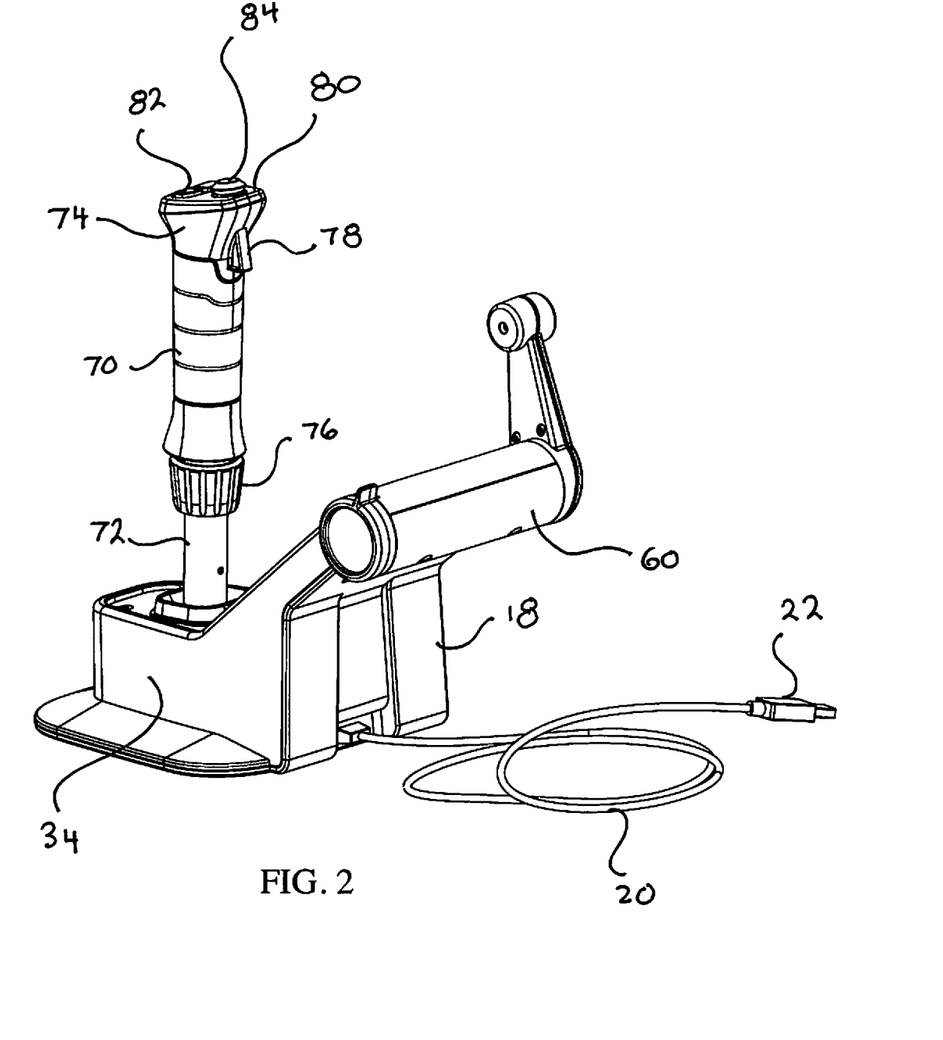
FIG. 2 is a rear perspective view of the joystick.
Figure 3:
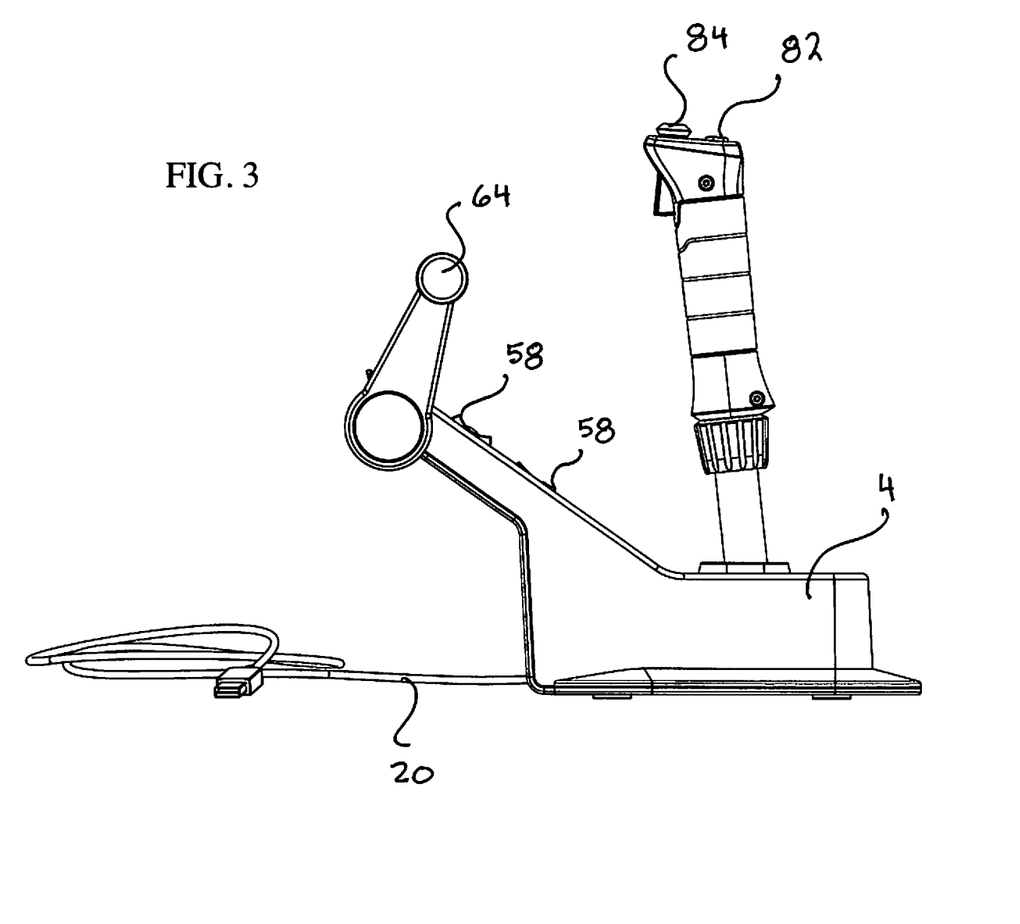
FIG. 3 is a right side view of the joystick.
Figure 4:
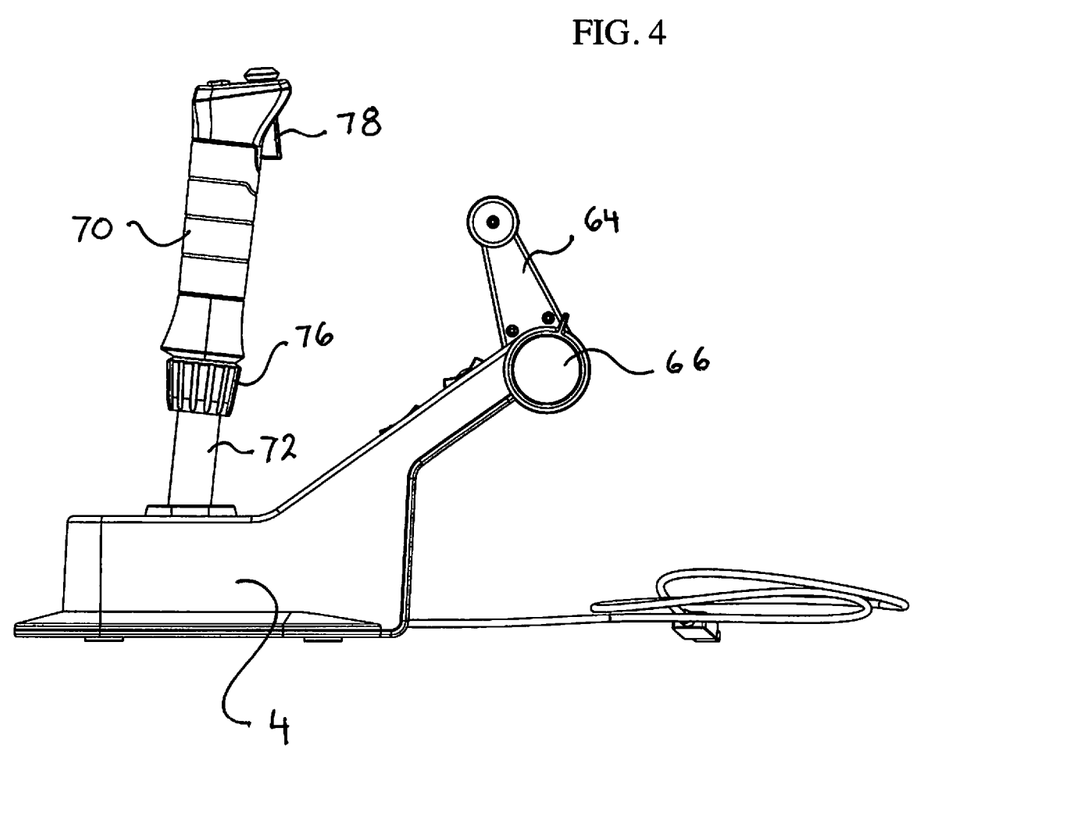
FIG. 4 is a left side view of the joystick.
Figure 5:
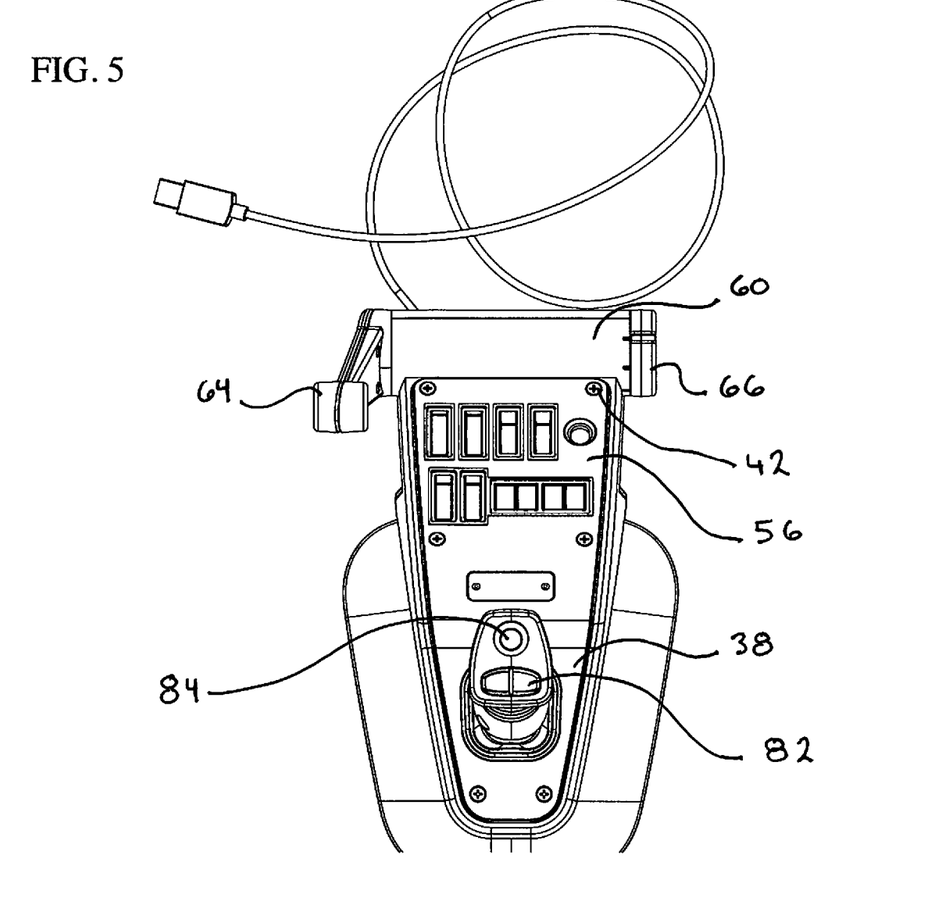
FIG. 5 is a top view of the joystick.
Figure 6:
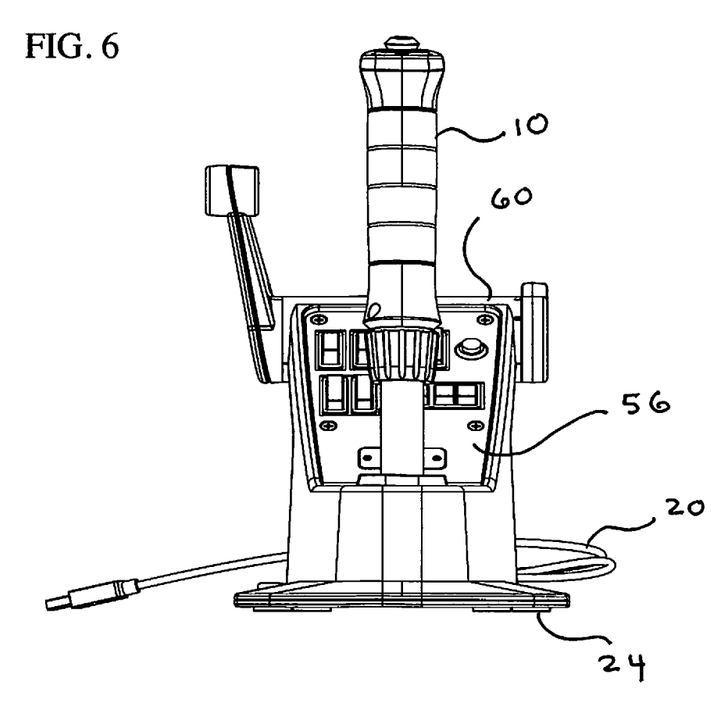
FIG. 6 is a front view of the joystick.

Looking at FIGS. 5 and 6, it can be seen that the upper top face 56 is angled vertically upward so as to face the user. Preferably this will be at an angle between 30 and 60 vertical degrees. This is to mimic that of a commercial plane's cockpit dashboard. Positioned on it is a series of switches 58 and a depressible button 61. Optionally, there may be a light operably connected to the CPU of the game or flight simulator for visual indication of some parameter's status. The switches 56 have the PCB's of their control modules affixed to the inside surface of the upper top face 56 so as to reside below them and transmit their analog signals to the game's or flight simulator's CPU.

Figure 9:
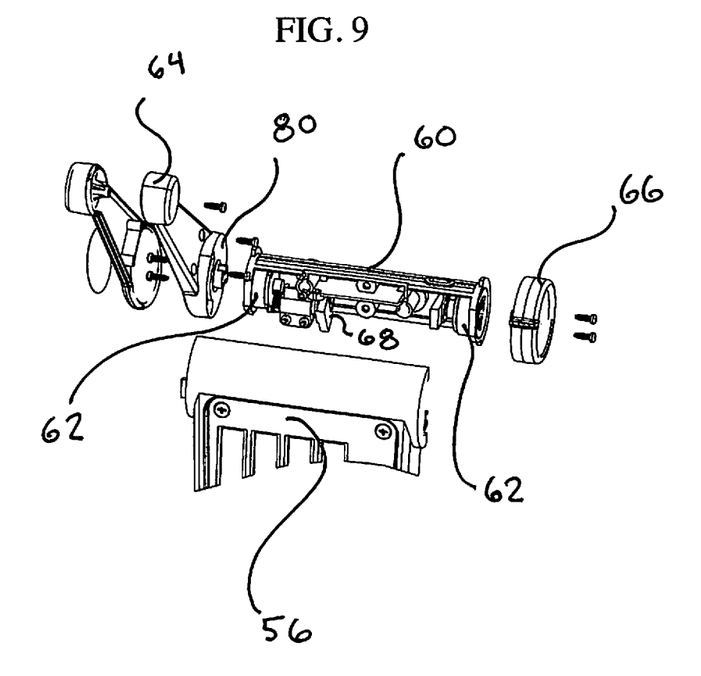
FIG. 9 is a front perspective cross sectional view of the control lever.

Passing horizontally through the housing body 4 at the top end of the upper top face 56, and extending between the left and right sides of the housing body 4, is a dual rotary control housing 60 that houses all of the operational electronics for the operation for two rotary controllers and two identical coupling mechanisms for the rotary controllers. (FIG. 9) It is cylindrical in shape yet need not be in other embodiments. The left and right ends of the dual rotary control housing 60 extend beyond the left and right sides of the housing body 4. On either end is operationally mounted a first half of a rotary coupler 62. In the preferred embodiment (which is set up for a right hander operator) there is a throttle lever 64 coupled to the left rotary coupler and a rotary knob 66 coupled to the right rotary coupler. The throttle lever 64 and the rotary knob 66 each have a second half rotary coupler 80 that matingly engages with the first half rotary coupler 62. The throttle lever 64 and the rotary knob 66 are held in engagement with the first half rotary couplers 62 of the dual rotary control housing 60 by mechanical fasteners engaged in threaded recesses on the second half rotary couplers 80. The throttle lever 64 and rotary knob 66 rotate their respective first half rotary coupler 62 they are affixed to. They are interchangeable for right or left handed operator preference. Behind each rotary coupler is a potentiometer 68 operatively connected to a PCB 70 which forms the control module. The rotation of the rotary knob 66 or the throttle lever 64 adjusts the potentiometer to alter the current that passes through the PCB to provide a variable analog signal to the CPU. Extending beyond the side faces of the housing body 4, the throttle lever 64 and rotary knob 66 are in easily accessible positions, free of inadvertent manipulation from a user manipulating the buttons, switches or joystick and high and away from the user's legs.

The joystick 10 is a hollow cylindrical rod with its proximal end connected to the gimbal housing 42 within the internal cavity of the housing body 4. It has a telescoping upper section 70 and a lower section 72 that is slidingly engageable within the inside of the upper section 70. In the preferred embodiment the joystick 10 may be tilted up to 60 degrees in any direction from a vertical position. The upper section may be adjusted vertically and locked into position by a threaded collet style assembly 76 at the bottom of the upper section 70 that frictionally connects the two sections. In this way the height or length of the joystick 10 can be adjusted for different size users. At the distal end of the joystick is formed an elongated knob 74 that has a trigger pull switch 78 extending from its front face. The knob 74 has an angled, planar top face 80 (FIGS. 1 and 2) that houses a pair of adjacent buttons 82, preferably used to pause or ON/OFF control the action, and a multi-positional HAT switch 84. These switches and buttons have their respective control modules mounted within the joystick 10 underneath them. As stated herein, all switches, buttons, triggers and rotary (knob) controllers are assignable in their gaming/flight simulator functions by the CPU through the application on the gamer's computer for that specific game or simulator.

There is a weighted mass 26 preferable a plate made of steel, securely mounted inside the housing body 4 by a set of mechanical fasteners 28 that thread into a set of vertical standoffs 30 extending normally from the inner face of the bottom plate 8. While not necessary when the controller 2 is cinched in between the user's legs and crouch, when the controller is used on a table, the weighted mass 26 increases the friction between the table and the feet 24 and also prevents the controller 2 from tipping when excessive sideway motion is placed on the joystick 10.

Figure 8:
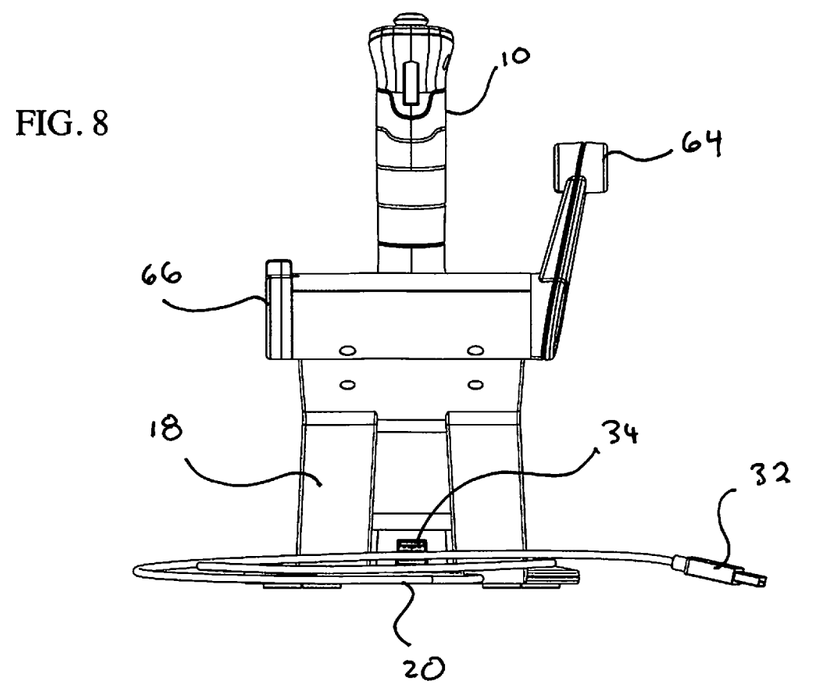
FIG. 8 is a rear view of the joystick.

From the back face 18 of the housing body 4 there is a computer connectable interface cable 20, preferably with a male USB connector 32 at its distal end that plugs into a matingly engageable electronic socket 34 that is in wired contact with the PCB's inside the controller 2. (FIGS. 7 and 8) This interface cable 20 connects the control module from the joystick 10 to the CPU of the game or flight controller and allows for data and electronic signal transfer.

Inside the controller, resides the electronics necessary to take the tactile manipulations performed on the controller and generate an operational analog signal which can be transmitted via a hard wire connection (or wirelessly via a Bluetooth or Wi-Fi protocol transmitter 80 (FIG. 7) to the central processing unit (CPU) of the game or flight simulator computer where they are transformed into a digital signal to affect different assigned actions or movements in the game or flight simulator. Generally, there are printed circuit boards (PCB's) positioned beneath every button, switch or trigger with a motion sensing device, generally a set of contacts thereon that are opened or closed by the action of moving the switch or depressing the button or pulling the trigger. These contacts complete or break a circuit, and this information is passed as an analog signal through the microprocessor of the PCB of the control module to the CPU. The joystick is mounted in a gimble cup or has adjustable potentiometers arranged on angles under or about it on its PCB to send a variable current signal to the CPU. The throttle lever and rotary knob are connected to potentiometers on their PCBs to also transmit a variable current signal from the microprocessor to the CPU. The power fed to the PCB circuits in the respective control modules may come from the wired connection to the CPU or may be provided by an onboard battery where wireless communication is used. The actual variable controlled by the switches, buttons, triggers, rotary knobs, joystick or lever are assignable by the CPU, (again through the game specific application on the gamer's computer) so different games and flight simulators may be operatively coupled to the device. The generation and transfer of the analog signal generated by the operators tactile manipulations to the CPU for processing and conversion into a game or simulator usable instruction, is well known in the art and will not be discussed in detail herein.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software that is loaded into the gamer's computer (the CPU) as a game or simulator specific application. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The joystick can utilize one or more connections to one or more remote CPUs, such as through a network interface, modem, or other communicative coupling. The joystick and its associated CPU (and it associated application) can be interconnected by way of a physical and/or logical network, such as an intranet, the Internet, local area networks, wide area networks, etc. One skilled in the art will appreciate that network communication can utilize various wired and/or wireless short range or long-range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A tactile manipulation electronic controller for participation in gaming and flight simulation training, comprising:
   a hollow housing body having a bottom, a front face, a back face and two side faces extending between and increasing in separation between said front face and said back face so as to form a U shaped perimeter bottom edge, and a top made of a lower top face and an angled upper top face;
   a base flange extending outward from said bottom edge along said front face and each of said two side faces, wherein said flange has a width that extends it a perpendicularly spaced distance from said front face and said two side faces of between two and six inches, and wherein said base flange has an outer perimeter edge that has the same U shaped configuration as said bottom edge, set apart from said bottom edge by said width, and decreasing in thickness toward said outer perimeter edge
   a joystick having a distal end and a proximal end, said proximal end connected to a two axis gimble assembly affixed within said housing body below said lower top face, said joystick extending vertically from said lower top face;
   a set of tactile controls mounted on said upper angled top face, said tactile controls selected from the group consisting of switches, buttons and rotary knobs;
   a set of control modules mounted inside said housing body and said joystick residing adjacent said tactile controls, communicating movements of said tactile controls to a connected game or flight simulator; and
   at least one polymer foot extending from said bottom and a weighted mass rigidly affixed to an inside of said hollow housing body.

2. The tactile manipulation electronic controller of claim 1, wherein said joystick has an upper section and a lower section wherein said lower section resides telescopically within said upper section and said upper section is vertically extendable from said lower section and lockable in an extended position by a collet style assembly at an intersection of said lower section and said upper section.

3. The tactile manipulation electronic controller of claim 1 further comprising;
   an elongated knob with a front face and a planar top face, said elongated knob formed at said proximal end of said joystick;
   a trigger pull switch extending from said front face;
   at least one second tactile control mounted on said planar top face, wherein said second tactile control on said upper angled top face is selected from the group consisting of switches and buttons; and
   a control module of said set of control modules housed within said joystick adjacent to said trigger pull switch.

4. The tactile manipulation electronic controller of claim 1, further comprising;
   a dual rotary control housing residing across a top edge of said upper top face, having a first end with an inner half coupling extending beyond one of said two sides of said housing body, and a second end having an identical second inner half coupling extending beyond another of said two sides of said housing body;
   a rotary control lever coupled to said first end, said rotary control lever having an outer half coupling engageable with said inner half coupling; and
   a rotary control knob coupled to said second end, said rotary control knob having a identical second outer half coupling engageable with said identical second inner half coupling;
   a control module from said set of control modules having an adjustable potentiometer operatively connected to said inner half coupling;
   a control module from said set of control modules having an adjustable potentiometer operatively connected to said second inner half coupling; and
   wherein said rotary control knob and said rotary control lever are interchangeable.

5. The tactile manipulation electronic controller of claim 1, further comprising;
   a dual rotary control housing residing across a top edge of said upper top face, having a first end with an inner half coupling extending beyond one of said two sides of said housing body, and a second end having an identical second inner half coupling extending beyond another of said two sides of said housing body;

a rotary control lever coupled to said first end, said rotary control lever having an outer half coupling engageable with said inner half coupling; and
a rotary control knob coupled to said second end, said rotary control knob having a identical second outer half coupling engageable with said identical second inner half coupling;
a control module from said set of control modules having an adjustable potentiometer operatively connected to said inner half coupling;
a control module from said set of control modules having an adjustable potentiometer operatively connected to said second inner half coupling; and
wherein said rotary control knob and said rotary control lever are interchangeable.

* * * * *